Patented Sept. 4, 1951

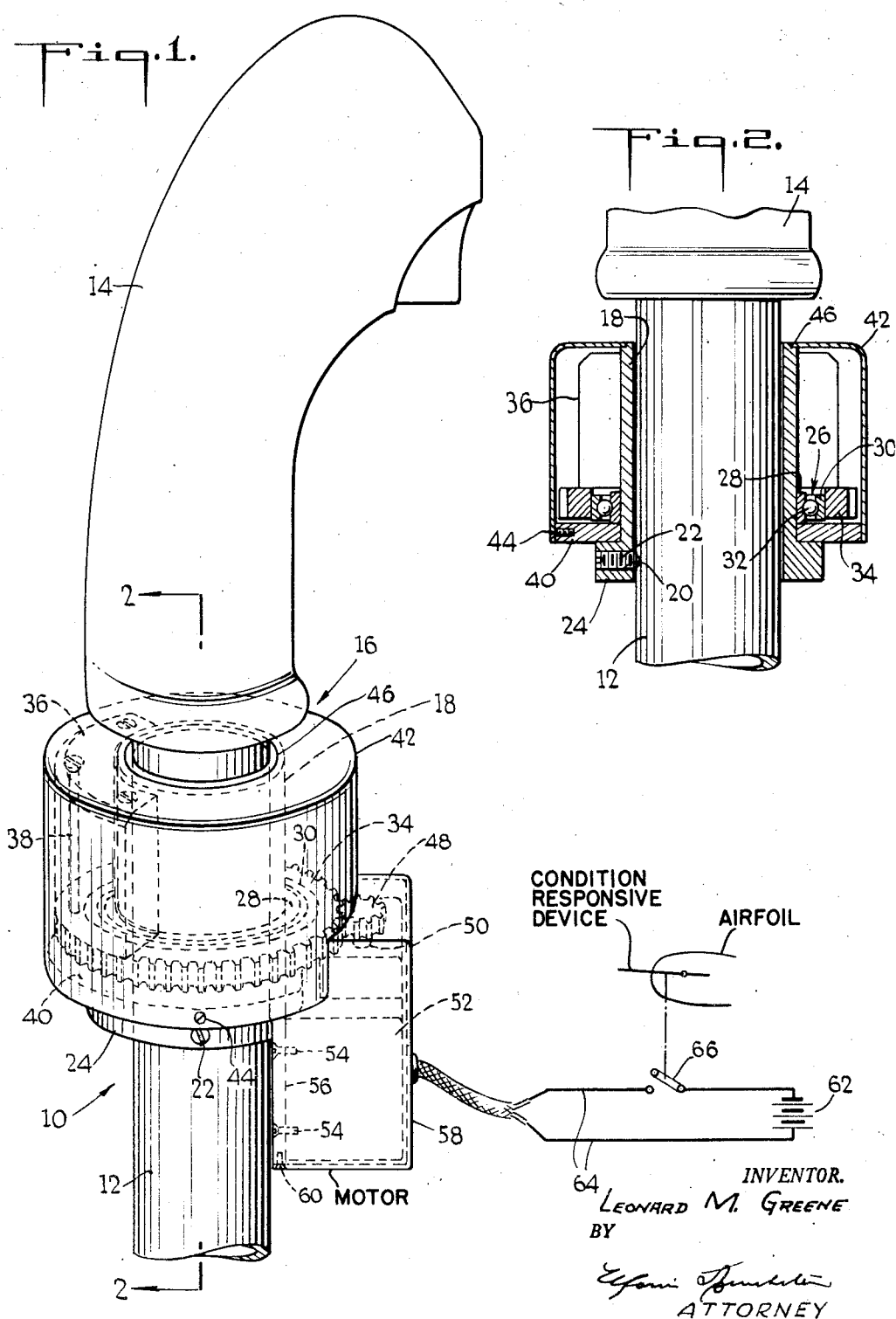

2,566,409

UNITED STATES PATENT OFFICE 2,566,409

VIBRATORY AIRCRAFT ALARM OF THE ROTARY ECCENTRIC WEIGHT TYPE

Leonard M. Greene, Scarsdale, N. Y., assignor to Safe Flight Instrument Corp., White Plains, N. Y.

Application October 21, 1949, Serial No. 122,623

6 Claims. (Cl. 177—329)

This invention relates to vibratory aircraft alarms of the rotary eccentric weight type.

By way of example my invention is described herein with respect to an aircraft stick shaker, i. e. a shaker for the control stick of an aircraft, the invention being particularly well suited for this purpose. However, it is to be understood that this specific form of my invention is only to be considered as illustrative and my invention is not to be deemed as limited thereby except to the extent to which features of such embodiment are pointed out below and are incorporated in the appended claims.

It is an object of my invention to provide an alarm of the character described which is compact and rugged and which in mounted position occupies a comparatively small space.

It is another object of my invention to provide an alarm of the character described which constitutes relatively few and simple parts and is economical to manufacture and easy to install.

In the specific embodiment of the invention hereinafter set forth an electric motor is used to turn the eccentric weight. If the weight were mounted to turn about the motor shaft considerable space would be occupied because the weight would have a throw considerably in excess of the distance from the motor shaft to the object on which the motor was mounted. This would entail displacing the motor to permit the eccentric to clear the object. There is very little free space in the region of the control stick of an aircraft so that, if the stick shaker should have the eccentric weight turning about the motor shaft, the stick shaker might be so bulky that it could not be used practically.

It is an object of the present invention to provide an alarm of the character described which is specially adapted to be mounted on slender objects being of such construction as to take up less space than it would if the eccentric weight were mounted to turn about the motor shaft.

Other objects of my invention will in part be obvious and in part will be pointed out hereinafter.

My invention accordingly consists in the features of construction, combinations of elements and arrangements of parts which will be exemplified in the device hereinafter described and of which the scope of application will be indicated in the appended claims.

In the accompanying drawings in which is shown one of the various possible embodiments of my invention;

Fig. 1 is a phantom perspective of an aircraft control stick having mounted thereon a stick shaker constructed in accordance with my invention; and Fig. 2 is a sectional view taken substantially along the line 2—2 of Fig. 1.

Referring now in detail to the drawings, the reference numeral 10 denotes a control stick of an aircraft. As is conventional this stick is connected through suitable mechanisms, for example, wires or servomotors, to the control surfaces of the aircraft so that the stick through its position governs movement of the aircraft.

The stick includes a shaft 12 and a handle 14, both of which are of standard construction. It may be mentioned here that various types of shaft contours conventionally are used. For example, some shafts are straight, as shown, from the point of support to the handle. Other shafts are curved at various portions of their lengths. Thus, one well known type of shaft is curved at both ends, the curvatures being in opposite directions so that the shaft resembles a modified S. The handle is removably mounted on the tip of the shaft by any suitable fastening means, for example by a few bolts (not shown).

The reference numeral 16 denotes the control stick shaker. Said shaker inludes a mounting member which is designed to be slipped on and secured to the shaft. To this end the mounting member is hollow and open-ended, and conveniently, as shown, may take the form of a tubular sleeve 18 whose diameter is sufficiently large to enable it to be slipped on the shaft of the control stick. It may be observed that where the stick has a curved handle end the internal diameter of the sleeve should be sufficiently large, taking into account the length of the sleeve, to permit the sleeve to be slid over this curved portion of the shaft.

The lower end of the sleeve is provided with a plurality of tapped apertures 20 designed to receive set screws 22 that are employed detachably to fasten the stick shaker to the shaft. If desired, these openings can be reinforced by a flange 24.

The sleeve serves as a support for an antifriction bearing 26 which comprises an inner race 28, an outer race 30 and a set of balls 32 rolling on and between the races. The inner race 28 is firmly secured to the sleeve 18, for instance by being force-fitted thereon, so that the outer race 30 is rotatable about the axis of symmetry of the sleeve. A ring gear 34 is firmly secured to the outer race 30, e. g. by force-fitting, so as to turn therewith about said axis of the sleeve.

The ring gear carries an eccentric weight 36 which is firmly attached thereto, for instance by means of screws 38. Any suitably configured weight can be used, the one illustrated herein extending over approximately 120° of the circumference of the gear. Said weight, for compactness, is in the shape of a tubular sector.

The ring gear, ball bearing and eccentric weight are contained in a housing constituting a base plate 40 which is permanently mounted on the sleeve 18 by a force-fit and a sheet metal cover 42 fashioned in the shape of a cup with its rim accommodating the base plate and attached thereto as by screws 44. The opposite end of the cover is apertured to pass the shaft 12 and may be seated on an annular shoulder 46 formed on the upper end of the sleeve.

The gear 34 meshes with a pinion 48 mounted on the output shaft 50 of an electric motor 52. The base of said motor is fastened, as by screws 54, to an extension 56 on the lower end of the sleeve 18. The motor and pinion are concealed by a sheet metal cover 58 secured, as by screws 60, to the extension 56. The motor is of the high speed fractional horse power type inasmuch as spinning the eccentric weight does not require a large torque. Accordingly, the diameter of the motor is considerably smaller than the diameter of the path travelled by the eccentric weight and, indeed, may be smaller than the diameter of the control stick shaft.

It will be appreciated that by thus orbiting the weight about the hollow center member in which a control member can be disposed and on which the motor is supported, a savings in space is effected which is so substantial that for the first time it is practical to employ a rotating weight in the limited space in which it may be disposed as a stick shaker for aircraft.

Moreover, with the arrangement described, the size of the weight, and therefore the amplitude of the shaking effect, can be increased to any desired magnitude without interfering with other parts of the aircraft or cramping the movements of the pilot.

In addition, the mounting of the weight as set forth hereinabove eliminates the tendency of the weight to twist the member on which it is mounted as it does when the weight is mounted to turn about an axis alongside the support.

Electric energy is supplied to the motor from any suitable source of electric power, as for example a battery 62, the electricity being led through feed wires 64, one of which is interrupted by a normally open switch 66 that is controlled by a condition responsive device, that is to say, a device which upon the occurrence of a condition moves from one position to another. Preferably the condition is one of imminent danger. A typical device of this character is shown in my Patent No. 2,478,967, which is dated August 16, 1949, which closes a switch when an aircraft reaches an attitude immediately preceding stall.

It thus will be seen that I have provided a device which achieves all the objects of my invention and is well adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

Having thus described my invention, I claim as new and desire to secure by Letters Patent:

1. In an aircraft having a control stick shaft, a source of electric energy, a switch, and a condition-responsive device which upon the imminence of danger closes said switch: a stick shaker, said stick shaker including a sleeve encircling said shaft, means to detachably secure said sleeve to said shaft, an anti-friction bearing having an inner race, an outer race and rolling elements between said races, the inner race being firmly fixed to said sleeve, a gear firmly fixed to the outer race, said bearing rotating about the axis of symmetry of the sleeve, a weight mounted to turn with said gear, said weight being disposed eccentrically of said axis, a pinion meshing with said gear, an electric motor mounted on said sleeve, said pinion being secured to the output shaft of the motor, and circuit means connecting said source to said motor through said switch.

2. In an aircraft having a control stick shaft, a source of electric energy, a switch, and a condition-responsive device which upon the imminence of danger closes said switch: a stick shaker, said stick shaker including a sleeve encircling said shaft, means to secure said sleeve to said shaft, an anti-friction bearing having an inner race, an outer race and rolling elements between said races, the inner race being firmly fixed to said sleeve, a gear firmly fixed to the outer race, said bearing rotating about the axis of symmetry of the sleeve, a weight mounted to turn with said gear, said weight being disposed eccentrically of said axis, a pinion meshing with said gear, an electric motor mounted on said sleeve and arranged to turn said pinion, and circuit means connecting said source to said motor through said switch.

3. In combination in an aircraft, a control stick having a shaft, a stick shaker, said stick shaker including a sleeve encircling said shaft, means to secure said sleeve to said shaft, an anti-friction bearing having an inner race, an outer race and rolling elements between said races, the inner race being firmly fixed to said sleeve, a gear firmly fixed to the outer race, said bearing rotating about the axis of symmetry of the sleeve, a weight mounted to turn with said gear, said weight being disposed eccentrically of said axis, a pinion meshing with said gear, and an electric motor mounted on said sleeve, said pinion being secured to the output shaft of the motor.

4. An aircraft signalling device adapted to impart a shaking effect to a control element of an aircraft, said device comprising a sleeve wherein said element is disposed, means to secure said sleeve to said control element, an anti-friction bearing having an inner race, an outer race and rolling elements between said races, the inner race being firmly fixed to said sleeve, a gear firmly fixed to the outer race, said bearing rotating about the axis of symmetry of the sleeve, a weight mounted to turn with said gear, said weight being disposed eccentrically of said axis, a pinion meshing with said gear, and an electric motor mounted on said sleeve and arranged to turn said pinion, said pinion being secured to the output shaft of the motor.

5. An aircraft signalling device adapted to impart a shaking effect to a control element of an aircraft, said device comprising a mounting member having an opening wherein said control element is disposed, means for securing said mounting member to said control element, a weight, means to mount said weight on said mounting member eccentrically of the central axis of said opening for rotation relative to said member about said axis to produce the shaking effect, and a motor to rotate said weight.

6. An aircraft signalling device adapted to impart a shaking effect to a control element of an aircraft, said device comprising a mounting member having an opening wherein said control element is disposed, means for securing said mounting member to said control element, a weight, and means to mount said weight on said mounting member eccentrically of the central axis of said opening for rotation relative to said mounting member about said axis to produce the shaking effect, a motor carried by said mounting member, and a driving train interconnecting said motor and said weight for rotating the weight.

LEONARD M. GREENE.

REFERENCES CITED

The following references are of record in the file of this patent:

UNITED STATES PATENTS

| Number | Name | Date |
|---|---|---|
| 1,881,878 | Nidy | Oct. 11, 1932 |
| 2,060,806 | Hunt | Nov. 17, 1936 |
| 2,128,250 | Harvard et al. | Aug. 30, 1938 |
| 2,258,747 | Doane | Oct. 14, 1941 |